United States Patent
Roth et al.

(10) Patent No.: US 9,882,956 B1
(45) Date of Patent: Jan. 30, 2018

(54) NETWORK-BACKED MASS STORAGE DEVICE

(71) Applicant: Amazon Technologies, Inc., Reno, NV (US)

(72) Inventors: Gregory Branchek Roth, Seattle, WA (US); Benjamin Elias Seidenberg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 385 days.

(21) Appl. No.: 13/793,054

(22) Filed: Mar. 11, 2013

(51) Int. Cl.
*G06F 15/16* (2006.01)
*H04L 29/08* (2006.01)

(52) U.S. Cl.
CPC .................................. *H04L 67/02* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,918,113 | B2 * | 7/2005 | Patel | G06F 8/65 709/219 |
| 7,051,052 | B1 * | 5/2006 | Shapiro et al. | 707/610 |
| 7,194,538 | B1 * | 3/2007 | Rabe | G06F 3/0605 709/220 |
| 7,275,103 | B1 * | 9/2007 | Thrasher | H04L 45/22 709/223 |
| 7,328,260 | B1 * | 2/2008 | Muthiyan | H04L 41/0681 709/220 |
| 7,401,338 | B1 * | 7/2008 | Bowen | H04L 41/5035 709/200 |
| 7,668,871 | B1 * | 2/2010 | Cai | G06F 21/6236 707/609 |
| 8,131,784 | B1 * | 3/2012 | Zhuge | G06F 17/30073 707/823 |
| 8,375,124 | B1 * | 2/2013 | Schwartz | 709/224 |
| 8,396,969 | B1 * | 3/2013 | Schwartz | H04L 29/00 707/999.003 |
| 2009/0055556 | A1 * | 2/2009 | Lachmund et al. | 710/11 |

* cited by examiner

*Primary Examiner* — Alicia Baturay
(74) *Attorney, Agent, or Firm* — Baker & Hostetler LLP

(57) ABSTRACT

Techniques are disclosed for a device that presents a mass storage device to a computing environment, and which stores data written to the device by the computer in a network storage service. The device also presents files stored in the network storage service to the computer as though those files were stored on a mass storage device.

25 Claims, 8 Drawing Sheets

NETWORK-BACKED MASS STORAGE DEVICE

BACKGROUND

A web services platform may remotely store files for a customer that that customer may later access. Likewise, a customer may locally store files on a mass storage device, such as a USB (Universal Serial Bus) mass storage device (commonly known as a "thumbdrive").

BRIEF DESCRIPTION OF DRAWINGS

Various embodiments in accordance with the present disclosure will be described with reference to the drawings, in which.

DETAILED DESCRIPTION

Figure 1:
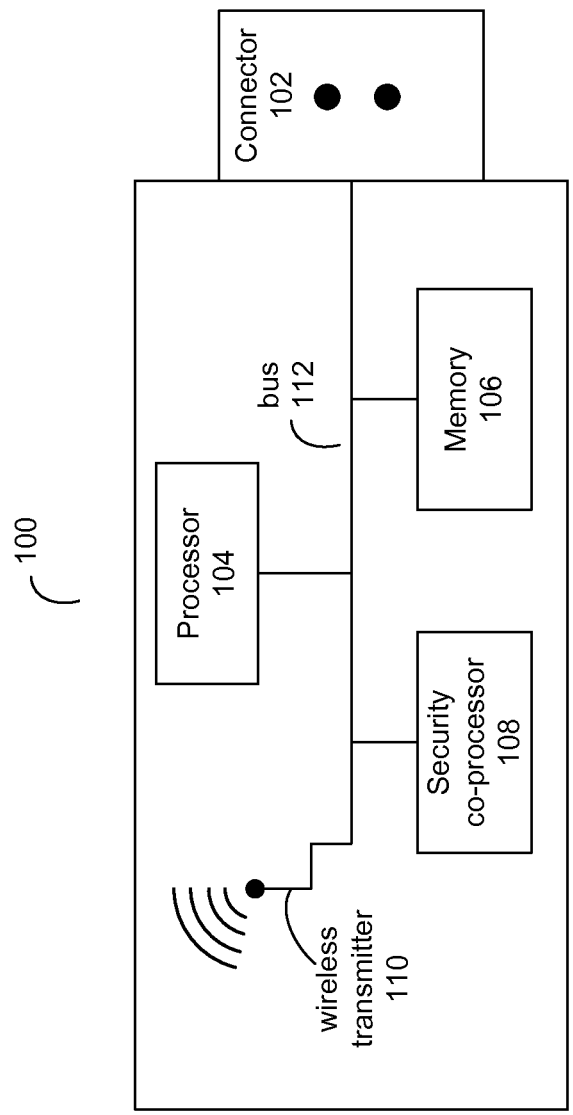
FIG. 1 depicts an example embodiment of a network-backed mass storage device.

In the following description, various embodiments will be described. For the purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the invention deal with presenting a hardware mass storage device to a computer—such as a USB mass storage device, where that mass storage device backs that data up to a network storage service. The device itself is what is configured to communicate with the network storage service, so no additional configuration of the computer may be required—so long as the computer is connected to the device, the computer may access files on the network storage service. Since most computers are pre-configured to communicate with mass storage devices, no additional configuration is required. This may be distinguished from other network storage service solutions that are implemented on the computer itself. These solutions may require configuring the computer itself, such as by installing software or entering authentication information into that software.

Embodiments of the invention may also be distinguished from a FUSE-type (Filesystem in USErspace) implementation. With FUSE, FUSE presents a virtual file system in a computer operating system's file system-layer. In embodiments of the present invention, rather than creating a virtual file system, these embodiments present a sequence of data that, when interpreted by an existing file system driver (as opposed to the new file system driver that FUSE installs to operate), that existing file system drive interprets as part of the functioning file system.

The device may be used to increase data security. The data on the device may be encrypted and protected by a security mechanism such as a pin. Likewise, where the device is configured to communicate with a network storage service, the network storage service may be able to remotely wipe data on the device. The network storage service may also maintain an audit log of when files on the device are accessed, or attempted to be accessed, and which computer performed the access. In other embodiments, the network storage service may maintain an inventory of the data or files stored on the device. The device may periodically send the audit log or inventory to the network storage service, send this information in response to a request for it from the network storage service, or send this information in response to user input received at a computing device that the device is connected to. This audit log of inventory may be considered to be metadata of the data stored on the device, because it is data about the data stored on the device. In embodiments, this metadata alone may be sent to the network storage service—that is, the metadata may be sent to the network storage service without sending the data itself to the network storage service. In embodiments, this information may include an identifier of a user that accessed or created a particular file, an identifier of a computing device with which the access or creation was made, or an identifier of the device itself.

Each device may encrypt data with a key, and access this key from a central location. Then, each device may be remotely wiped from this central location by denying access to that key. In other embodiments, security may exist by the nature of the device itself. The device may store data in transient memory (e.g., RAM), and when it is disconnected from a computer, then the data in the transient memory is lost because power is cut to it. In this manner, a device may have to re-authorize with a network storage service each time it connects to a new computer, and the network storage service may deactivate a particular device when it attempts to power up via a new computer (or a computer that it was previously connected to).

Before turning to the figures, a network storage service will be described, including how a network-backed mass storage device may communicate with such a network storage service. While the technology is described here as a network storage service, in embodiments of the invention, this may more generally be described as an online storage service, or a network-accessible storage service, where a remote server or group of servers (such as in a datacenter that executes virtual machines on a plurality of physical hosts to provide the service) provide data storage and access services to remote customer computers. In embodiments of the invention, a network-backed mass storage device may communicate with a network storage service to upload data to the network storage service. An example of a network storage service is described herein, and it may be appreciated that there are other ways to implement a network storage service. As described herein, the network-backed mass storage device presents itself to a computer as a mass storage device that stores data in block format, and the network storage service stores data in a bucket format (described below). When the computer writes data to the network-backed mass storage device, the network-backed mass storage device translates these data-writing instructions from instructions using the block format that the network-backed mass storage device presents to the computer to instructions using the bucket format of the network storage service.

Network storage service stores objects in buckets. A bucket is a container for objects stored in the network storage service. Every object is contained in a bucket. For example, if the object named photos/puppy.jpg is stored in the johnsmith bucket, then it is addressable using the URL http://johnsmith.[[NETWORK STORAGE SERVICE URL]]/photos/puppy.jpg. Buckets may serve several purposes: they organize the network storage service's namespace at the highest level, they identify the account responsible for storage and data transfer charges, they play a role in access control, and they serve as the unit of aggregation for usage reporting. A bucket may also be configured so that it is created in a specific region, where the network storage service is divided into regions (such as to ensure that particular data is stored in a specific country).

An object stored in a bucket may be the fundamental unit of data stored in a web services platform. Objects consist of object data and metadata. The data portion is opaque to web services platform. The metadata is a set of name-value pairs that describe the object. These include some default metadata such as the date last modified, and standard HTTP metadata such as Content-Type. The customer may also specify custom metadata at the time the object is stored.

A key then uniquely identifies an object within a bucket, and every object in a bucket may be assigned one key. Then, the combination of a bucket and key (and possibly a version of the object) may uniquely identify each object.

An API request to the web services platform may be generated in REST (Representational State Transfer) or SOAP (Simple Object Access Protocol). The REST API is a HTTP (HyperText Transfer Protocol) interface to the web services platform. Using REST, a customer may make standard HTTP requests to create, fetch, and delete buckets and objects.

The REST API may use standard HTTP headers and status codes, so that standard browsers and toolkits work as expected. In some embodiments, functionality may be added to HTTP (for example, headers may be added to support access control). In these cases, this added functionality may be added in a manner that matches the style of standard HTTP usage.

The SOAP API may provide a SOAP interface using document literal encoding. A SOAP toolkit may be used to create bindings, and then the bindings may be used to call the network storage service.

Operations effectuated via the API may include: (1) creating a bucket—creating and naming a bucket in which to store objects; (2) writing an object—storing data by creating or overwriting an object. This operation may include specifying a unique key in the namespace of the bucket for the object and access control on the object; (3) reading an object—reading data back, such as via a HTTP (HyperText Transfer Protocol) or peer-to-peer protocol (such as BitTorrent); (4) deleting an object—deleting some data; or (5) listing keys—listing the keys contained within a bucket (including possibly filtering the key list based on, e.g., a regular expression).

Requests from the network-backed mass storage device to the web services platform may be signed. This signature may serve to authenticate the customer to the web services platform. The same request may be allowed for one customer account (or user within that customer account) but disallowed for another customer (for instance, to write to a particular bucket). By way of example, the following may be used to sign a request from the network-backed mass storage device to the web services platform where a REST API is used.

A REST API may use a HTTP scheme that is based on a keyed-HMAC (Hash Message Authentication Code) for authentication. To submit a request that may be authenticated, a customer may first concatenate selected elements of the request in a specific order to form a unique string, and then use a customer-assigned secret key (to be differentiated from the key that uniquely identifies an object within a bucket) to calculate an HMAC for that string. This may be considered to be signing the request, and the output of the HMAC calculation may be considered to be the signature for the request. This signature may then be added as a parameter of the request, and sent to the web services platform.

When the web services platform receives a signed request, it may fetch the customer's secret key (a copy of the secret key that the customer used to calculate the HMAC for the string; the web services platform may store this access key locally). The web services platform may use this access key to compute a signature for the received request in the same manner as the customer originally calculated the signature for the request. The web services platform may then compare the calculated signature against the signature presented by the customer. If the two signatures match, the web services platform authenticates the customer since the customer most likely has access to that customer's access key, and therefore acts with the authority of the principal to whom the key was issued. If the web services platform determines that the two signatures do not match, then the web services platform may determine not to carry out the request and may send the customer an error message.

The following is an example of a GET request using a REST API:
GET/photos/puppy.jpg HTTP/1.1
Host: johnsmith.[[NETWORK STORAGE SERVICE URL]]
Date: Tues, 12 Feb. 2013 19:37:58+0000
Authorization: AKIAIOSFODNN7EXAMPLE:frJIUN8DYpKDtOLCwollyllqDzg=

The first line of the request indicates that the request is to get certain data from the web services platform and that this data is a photo located at "/photos/puppy.jpg." The second line of the request indicates the host where this data is located. The third line of the request indicates the time at which the request is being made. The fourth line of the request indicates the signature as calculated per the above.

Using this request, the authorization may be assigned as follows. The authorization line has the format of "Authorization:"+access key+":"+signature. The string to sign may be "GET\n\nTues, 12 Feb. 2013 19:37:58+0000\n/johnsmith/photos/puppy.jpg." The signature may be determined from the string by using the string as the input to an HMAC. This string includes concatenated information about the type of request, the date of the request, and the data to get.

The following is an example of a PUT request using a REST API:

PUT/photos/puppy.jpg HTTP/1.1
Content-Type: image/jpeg
Content-Length: 94328
Host: johnsmith.[[NETWORK STORAGE SERVICE URL]]
Date: Tues, 12 Feb. 2013 19:37:58+0000
Authorization: AKIAIOSFODNN7EXAMPLE: MyyxeRY7whkBe+bq8fHCL/2kKUg=

The first line of the request indicates that the request is to upload certain data to the web services platform, and that this data will be located at "/photos/puppy.jpg." The second line of the request indicates that the type of data being uploaded is a JPEG image. The third line of the request indicates that the size of the data being uploaded is 94,328 bytes. The fourth line of the request indicates the host where this data will be located. The fifth line of the request indicates the time at which the request is being made. The sixth line of the request indicates the signature as calculated per the above.

FIG. 1 depicts an example embodiment of a network-backed mass storage device. Network-backed mass storage device 100 may be referred to this way because it presents itself to a computing device as a mass storage device, and data written to or read from it may also be stored on network-accessible storage. Network-backed mass storage device 100 may be used, for example, to present a mass storage device to computing environment 220 of FIG. 2, and when computing environment 200 writes data to network-backed mass storage device 100, network-backed mass storage device 100 will then upload that data to a network storage service, such as network storage service 202 of FIG. 2.

As depicted, network-backed mass storage device 100 comprises connector 102 (which may be a physical connector), processor 104, memory 106, security co-processor 108, wireless transmitter 110, and communications bus 112. It may be appreciated that there are embodiments of the invention that implement network-backed mass storage device 100 with more or fewer components than are depicted here. For instance, there may be embodiments of the invention that implement network-backed mass storage device 100 without security co-processor 108. It may also be appreciated that there are embodiments of the invention that implement network-backed mass storage device 100 with the components in a different configuration than is depicted here. For instance, rather than all components being connected on communications bus 112, there may be multiple communications busses, without each component being connected on each bus. In embodiments, the functionality of the components of network-backed mass storage device 100 may be implemented in a single microcontroller.

Figure 2:
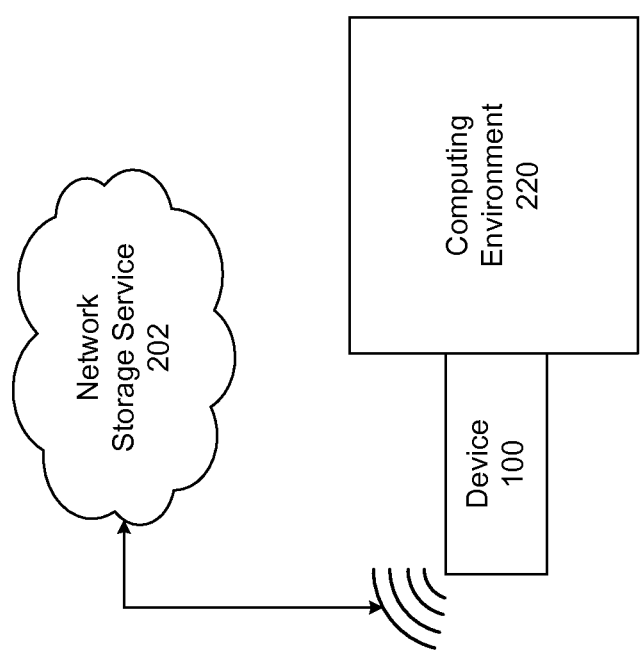
FIG. 2 depicts an example embodiment of a network-backed mass storage device that is being used to transfer files from a computing environment to a network storage service.

Connector 102 is used to connect network-backed mass storage device 100 to a computing environment, such as computing environment 220 of FIG. 2. Connector 10 may be implemented to adhere to a variety of protocols or standards, such as versions of USB (Universal Serial Bus), Firewire, eSATA, or Thunderbolt. That connector 10 is implemented to adhere to a protocol or standard is an aspect of how network-backed mass storage device 100 may present itself to a computing environment as a mass storage device, independent of its network-backed storage capabilities.

Processor 104 may be implemented, for example, as a general purpose central processing unit (CPU). Processor 104 may also be implemented as a special purpose processor that is designed and fabricated specifically to implement functions of network-backed mass storage device 100. Processor 104 may coordinate the operations of network-backed mass storage device 100. For example, network-backed mass storage device 100 may be configured so that a computing environment connected to network-backed mass storage device 100 may write to memory 106 without intervention by processor 104. Processor 104 may be used to read data that has been written to memory 106 by the computing environment, translate that data into a format understood by a network storage service, and direct wireless transmitter 110 to upload this translated data to the network storage service.

Memory 106 may be implemented as flash memory, among other types of memory. In embodiments, memory 106 may be persistent, such that it holds its state and continues to store data when it is not powered by being connected to a computing environment. In other embodiments, memory 106 may not be persistent, such that it does not continue to store data when it is not powered by being connected to a computing environment. Where memory 106 is implemented as flash memory, memory 106 may comprise, for example NAND gates (where the storage capabilities are implemented through gates that perform a NOT-AND operation on their inputs), or NOR gates (where the storage capabilities are implemented through gates that perform a NOT-OR operation on their inputs).

Memory 106 may be implemented in a block-based storage format, such as where memory 106 is implemented using versions of flash memory. In a block-based storage format, data is structured into a set of blocks—a set of sequences of bits having a standardized length (a block size). An example of a block-based storage format that may be used by memory 106 is FAT (File Allocation Table) format.

Security co-processor 108 may be a memory used to implement a version of a security co-processor standard. In embodiments of the invention, security co-processor 108 may be a ROM (read-only memory) chip that is used to store an encryption key and/or authentication information for network-backed mass storage device 100. Where security co-processor 108 stores an encryption key, this encryption key may be used to encrypt data stored in memory 106 and/or data that is being transmitted to a network storage service by wireless transmitter 110. For example, this encryption key may be an RSA (Rivest-Shamir-Adleman) encryption key. Where security co-processor 108 stores authentication information for network-backed mass storage device 100, this authentication information may be data that uniquely identifies the network-backed mass storage device 100 and/or uniquely identifies a customer associated with network-backed mass storage device 100 by a network storage service that is configured to communicate with network-backed mass storage device 100.

Wireless transmitter 110 may be a wireless transmitter that is used by network-backed mass storage device 100 to communicate with a network storage service. Wireless transmitter may be, for example, a cellular transmitter (such as one that adheres to a version of a 1G, 2G, 3G, or 4G standard), or a Wi-Fi transmitter.

Communications bus 112 is depicted as connecting the other components of network-backed mass storage device 100—connector 102, processor 104, memory 106, security co-processor 108, and wireless transmitter 110—to communicate with each other by sending data from one component to another component.

FIG. 2 depicts an example embodiment of a network-backed mass storage device that is being used to transfer files from a computing environment to a network storage service. For example, network-backed mass storage device 100 of FIG. 1 may be used to present a mass storage device to computing environment 220 of FIG. 2, and when computing environment 220 writes data to network-backed mass storage device 100, network-backed mass storage device 100 will then upload that data to network storage service 202.

As depicted, network-backed mass storage device 100 is connected to computing environment 220 via the computing environment's interface of computing environment 220. Network-backed mass storage device 100 presents itself to computing environment 220 as a mass storage device, such as a USB mass storage device. A mass storage device implements a known set of communications protocols so that computing environment 220 is configured to read data from and write data to network-backed mass storage device 100 where computing environment 220 is configured to read data from and write data to mass storage devices.

Computing environment 220 may be a computer comprising such things as a processor, memory, and disk storage. Computing environment 220 may also comprise a physical connector interface to which connector 102 of network-backed mass storage device 100 may connect so that network-backed mass storage device 100 and computing environment 220 are physically coupled. This interface may be, for example, a USB port, a Firewire port, or a Thunderbolt port.

Also as depicted, network-backed mass storage device 100 is communicatively coupled with network storage service 202. Network-backed mass storage device 100 may use wireless transmitter 110 to establish a wireless communications link with network storage service 202 via the INTERNET. In embodiments, network storage service 202 may authenticate network-backed mass storage device 100 in the process of establishing this wireless communications link. This process of authentication may include the network storage service 202 validating authentication information stored on security co-processor 108 that uniquely identifies the network-backed mass storage device 100 itself and/or a customer account associated with network storage service 202.

When computing environment writes data to the mass storage device interface presented to it by network-backed mass storage device 100, network-backed mass storage device 100 may store that data in memory 106. Network-backed mass storage device 100 may also transmit that data to network storage service 202 via wireless transmitter 110. In embodiments of the invention, and as described in more detail below, network-backed mass storage device 100 may perform operations on this data before transmitting it to network storage service 202, such as translating the data from a block-based format to a format of the network storage service 202. In other embodiments, and as described in more detail below, network-backed mass storage device 100 may not immediately transmit the data to network storage service 202. For instance, there may not be a communications link established between network-backed mass storage device 100 and network storage service 202 at the time that computing environment 220 writes data to network-backed mass storage device 20 (such as because network-backed mass storage device 100 is out of range of a transmission tower or base station that may be communicated with by wireless transmitter 110). In such embodiments, network-backed mass storage device 100 may initially store the data in memory 106, and then, when the wireless communication link with network storage service 202 is later established, transmit the data from memory 106 to network storage service 202.

Computing environment 220 may also use network-backed mass storage device 100 to read data stored by network storage service 202. When connected to computing environment 220, network-backed mass storage device 100 may retrieve a set of files stored by network storage service 202 for a corresponding user account, translate those files into a format of a file system of computing environment 220 (such as versions of the Extended file system), and present these translated files to computing environment 220 so that computing environment 220 may read these translated files as if they were a normal part of the file system of computing environment 220.

In embodiments of the invention, network-backed mass storage device 100 may store some data locally and present both the locally stored data and the data for the user account on network storage service 202 to the computing environment 220 as if all of the data were stored locally by network-backed mass storage device 100. Network-backed mass storage device 100 may maintain a directory structure for its block format and this directory structure may include data stored on network storage service 202. When computing environment 220 attempts to access this data that is stored remotely on network storage service 202, network-backed mass storage device 100 may translate the data to (or from) a format used by network storage service 202 from (or to) a block-based format that corresponds to the block-based format that computing environment expects to be accessing from a mass storage device. In embodiments of the invention, when computing service 20 attempts to write data to network-backed mass storage device 100, network-backed mass storage device 100 may translate this data from a block format to data in a format of the network storage service 202 through a series of REST and or SOAP API calls (such as a PUT call in a REST API call).

In embodiments of the invention, when computing environment 220 attempts to read data from network-backed mass storage device 100, and that data is already stored locally on network-backed mass storage device 100, the data may already be stored in a block-based format. In this scenario, network-backed mass storage device 100 may send the data to computing environment 220 without performing additional translation on the data. In other embodiments of the invention, when computing environment 220 attempts to read data from network-backed mass storage device 100, and that data is not already stored locally on network-backed mass storage device 100, the data may be stored in a non-block-based format used by network storage service 202. In this scenario, network-backed mass storage device 100 may retrieve the data from the network storage service 202, translate the data from the network storage service's format into a block-based format expected by computing environment 220, and send the translated data to computing environment 220.

Figure 3:
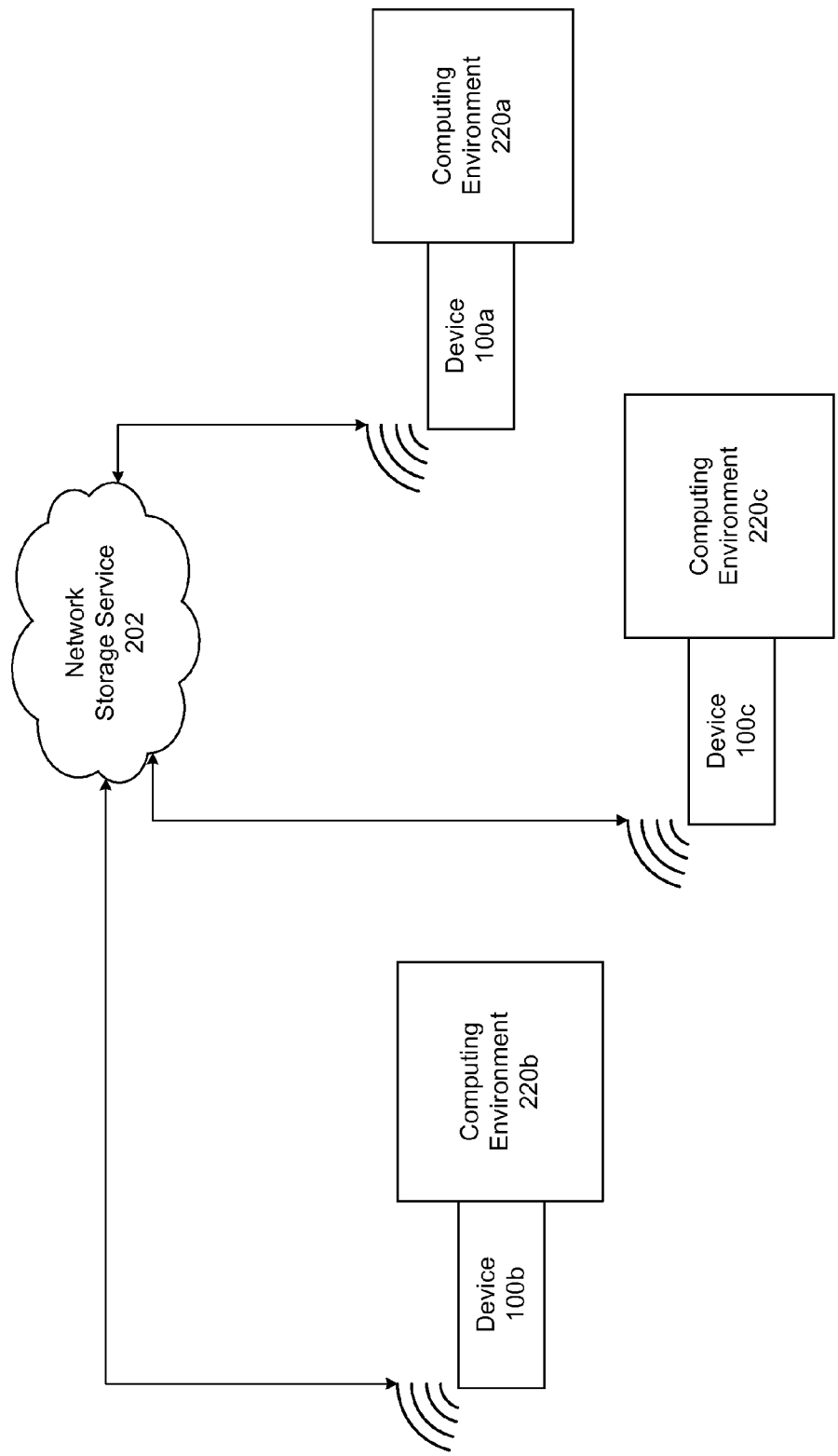
FIG. 3 depicts an example embodiment of multiple network-backed mass storage devices being used in concert to synchronize the files available among multiple computing environments.

FIG. 3 depicts an example embodiment of multiple network-backed mass storage devices being used in concert to synchronize the files available among multiple computing environments. For example, where there are multiple computing environments 220 (depicted here as computing environments 220a, 220b, and 220c), and each computing environment 220 is connected to a network-backed mass storage device 100 (depicted here as network-backed mass storage devices 100a, 100b, and 100c), then one computing environment 220 uses its respective network-backed mass storage device 100 to upload data to network storage service 202, network storage service 202 may also synchronize that data with the other network-backed mass storage devices 200, thereby making the data locally available to their respective computing environments 220.

For example, computing environment 220a may use network-backed mass storage device 100a to upload data to network storage service 202. When the data has been stored in network storage service 202, network storage service 202 may then send that data to network-backed mass storage device 100b and network-backed mass storage device 100c, to make the data available to computing environment 220b and computing environment 220c, respectively. In embodiments of the invention, upon storing the data in network storage service 202, network storage service 202 may send the data to network-backed mass storage device 100b and network-backed mass storage device 100c.

In other embodiments of the invention, network-backed mass storage device 100b and network-backed mass storage device 100c may periodically query network storage service 202 for the presence of new data. Where that new data is being stored on network storage service 202, then network-backed mass storage device 100b and network-backed mass storage device 100c may download that data, thus effecting synchronization of data between network-backed mass storage device 100a, network-backed mass storage device 100b, and network-backed mass storage device 100c—any, by extension, computing environment 220a, computing environment 220b, and computing environment 220c.

Figure 4:
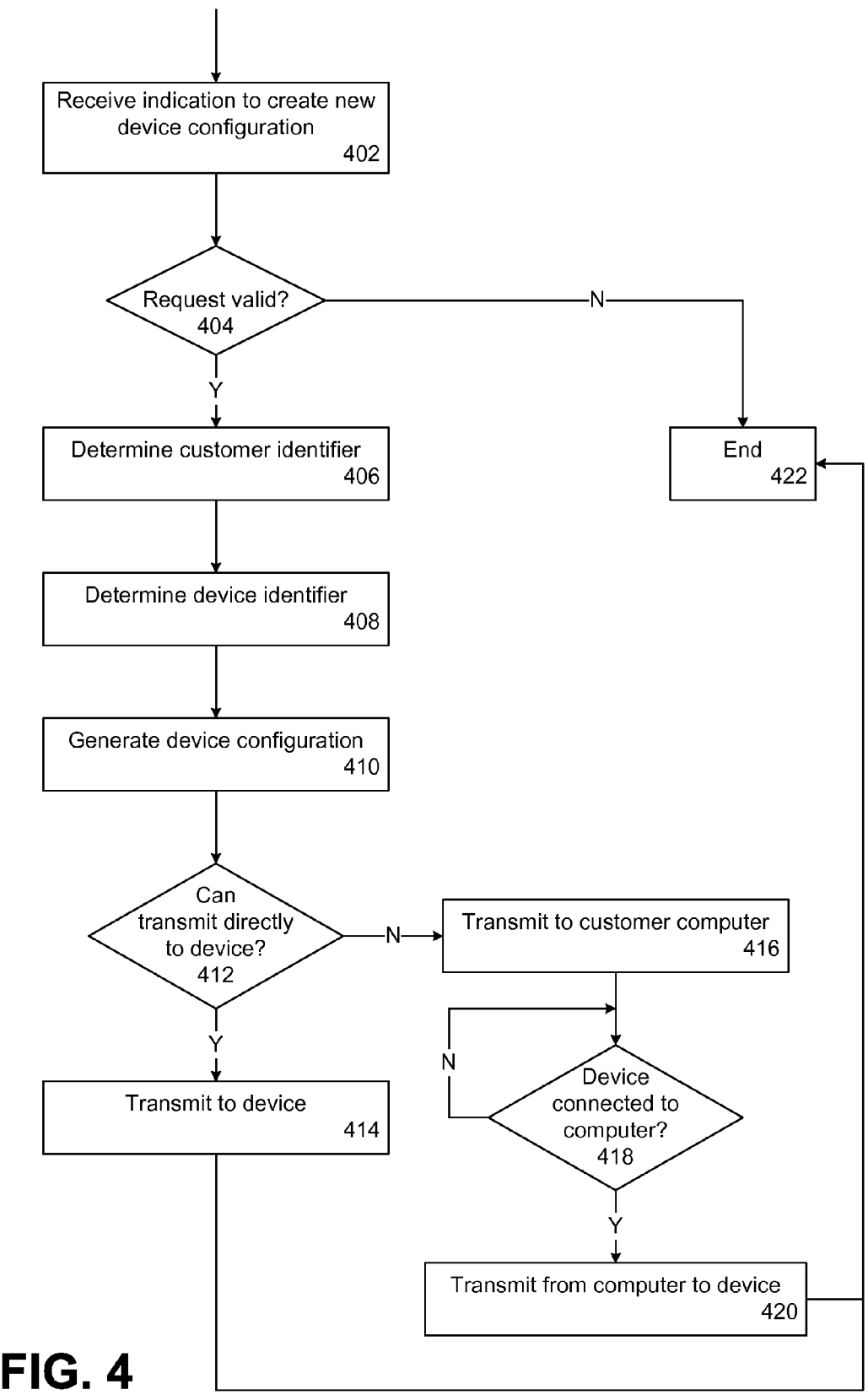
FIG. 4 depicts example operating procedures for configuring a network-backed mass storage device.

FIG. 4 depicts example operating procedures for configuring a network-backed mass storage device. These operating procedures of FIG. 4 may be used, for instance, to configure network-backed mass storage device 100 of FIG. 1 to communicate with network storage service 202 of FIG. 2 when network-backed mass storage device 100 is coupled to computing environment 220 of FIG. 2. After the network-backed mass storage device has been configured per the operating procedures of FIG. 4, the configured network-backed mass storage device may be used to, for example, make files stored on the network storage service accessible to the computing environment, as depicted in FIG. 4, or write files from the computing environment to the network storage service, as depicted in FIG. 4.

Figure 5:
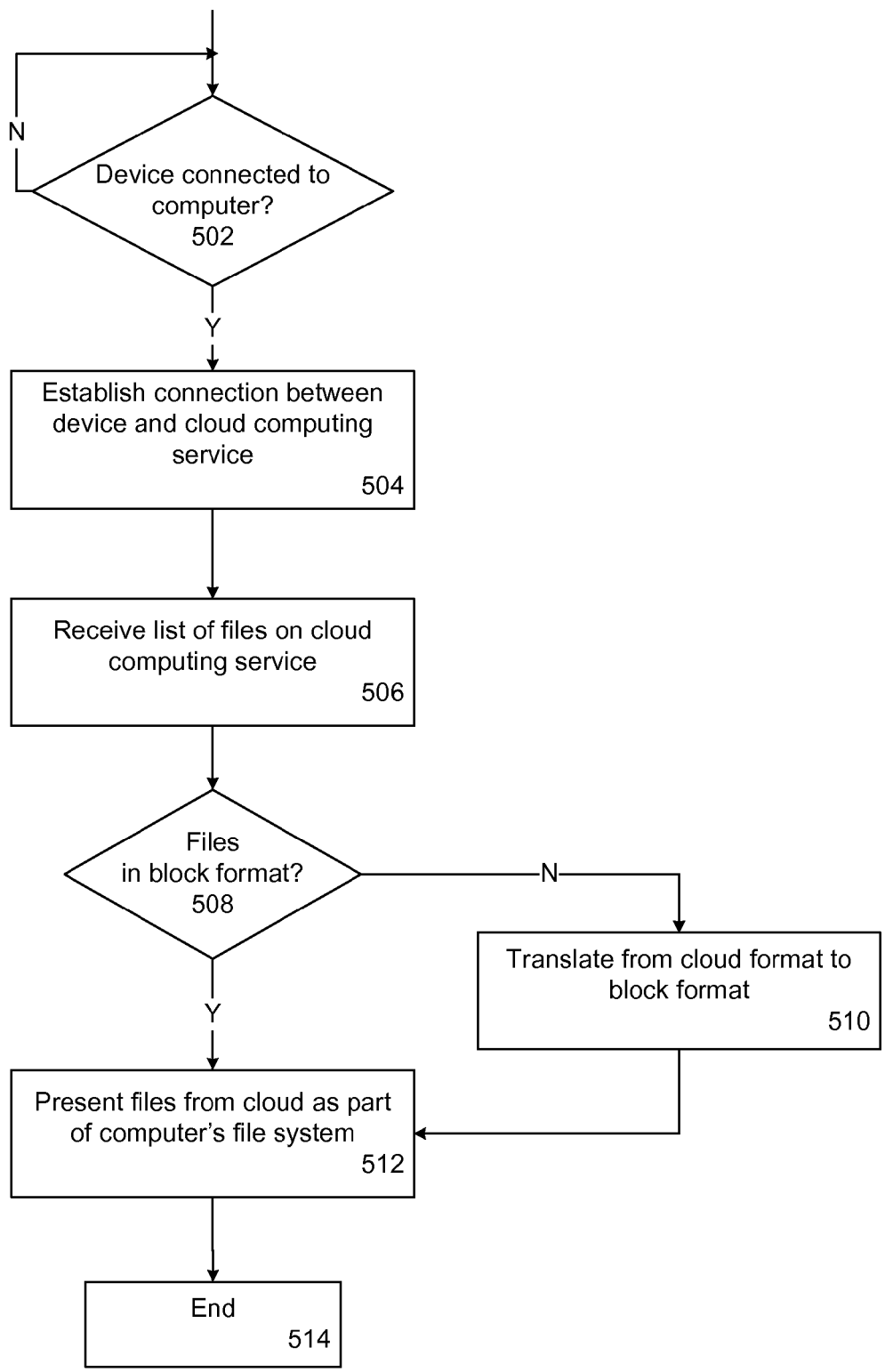
FIG. 5 depicts example operating procedures for making files stored on a network storage service accessible to a computing environment via a network-backed mass storage device that is coupled to the computing environment.
Figure 6:
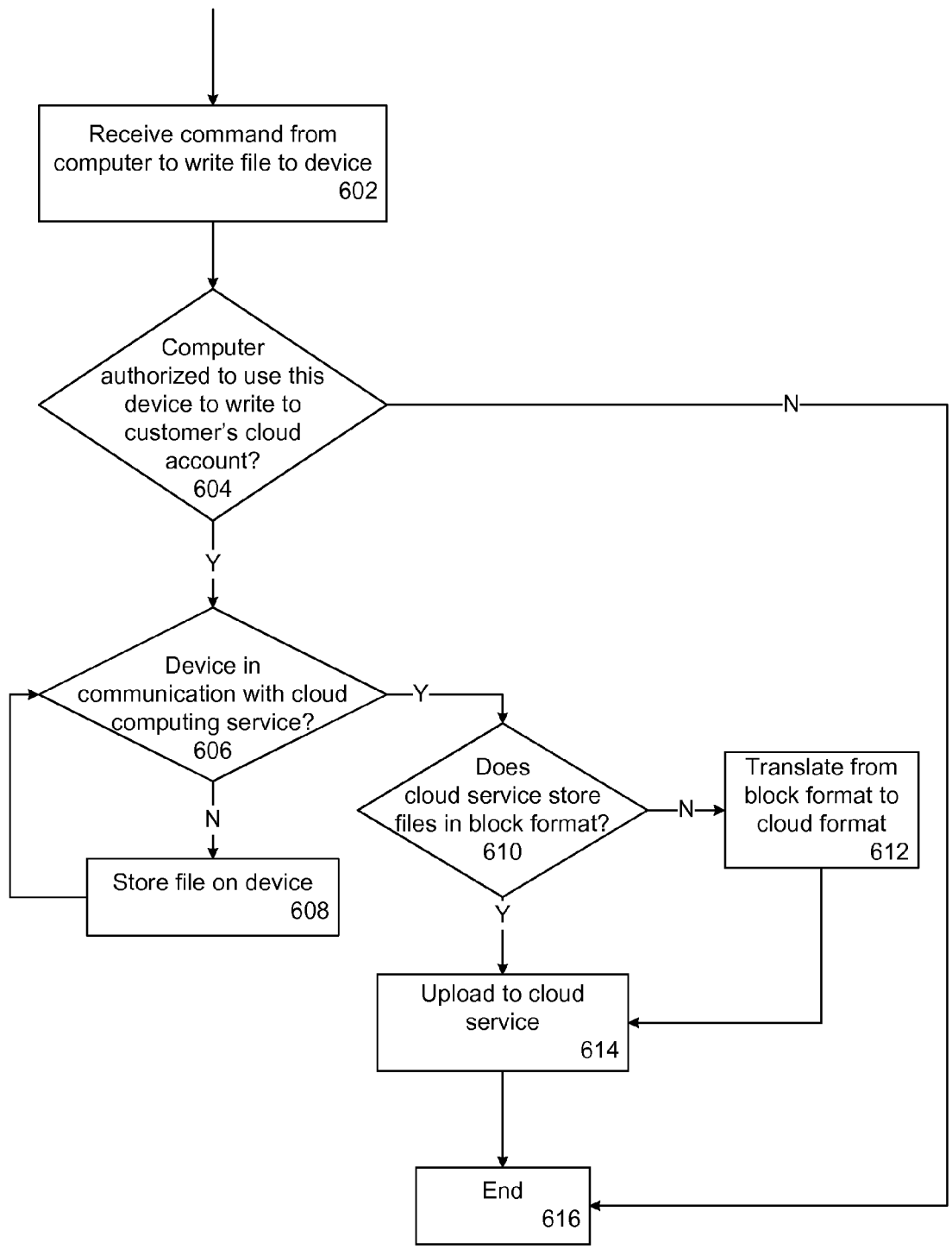
FIG. 6 depicts example operating procedures for writing files from a computing environment to a network storage service via a network-backed mass storage device that is coupled to the computing environment.

It may be appreciated that there are embodiments of the invention that implement the operating procedures of FIG. 4 (or FIGS. 5-6) in a different order than as is depicted in FIG. 4 (or FIGS. 5-6). For instance, there may be embodiments of the invention that do not implement operation 404, or which switch the order in which operation 406 and operation 408 are implemented.

The operating procedures of FIG. 4 begin with operation 402, which depicts receiving a request to create a new device configuration. Operation 402 may be implemented for instance, by a customer entering the request in a web page form that is part of a web-based controller interface for the customer's account with the network storage service 202. The request may be a request to purchase (or otherwise obtain) a new network-backed mass storage device 100, with the request implying that the device should be configured so that the customer may use it. In other embodiments, the request may indicate the desire for a new device configuration, independent of obtaining a new network-backed mass storage device 100. Where the request also includes a request for a new network-backed mass storage device 100, the new network-backed mass storage device 100 may be configured before it is sent to the customer. Where the customer already possesses the network-backed mass storage device 100, the device configuration may be transmitted to the customer independently of transmitting network-backed mass storage device 100 to the customer (as depicted in operation 416), or the device configuration may be transmitted directly to the network-backed mass storage device 100 (as depicted in operation 414). In embodiments, operation 402 may include, or be preceded by, creating a customer account for the requestor with the network storage service. When the network storage service creates a customer account, the network storage service may create a private key for the customer account that may be used to, for instance, encrypt data that is transmitted by the customer's network-backed mass storage device to the network storage service.

After operation 402, the operating procedures of FIG. 4 move to operation 404, which depicts determining whether the request received in operation 402 is valid. This may comprise authenticating user credentials to determine that the requestor is authorized to generate a device configuration for the associated customer account. Where there is a charge associated with generating a device configuration, operation 404 may determine whether there is a sufficient balance available to the customer account, or whether payment information indicated in the request is valid.

If, in operation 404, it is determined that the request received in operation 402 is invalid, the operating procedures of FIG. 4 move to operation 422, where the operating procedures of FIG. 4 end. In embodiments of the invention, upon determining that the request is invalid, the computer that implements the operating procedures of FIG. 4 may notify the requestor that the request is invalid before moving to operation 422.

If, instead, in operation 404, it is determined that the request received in operation 402 is valid, the operating procedures of FIG. 4 move to operation 406, which depicts determining a customer identifier based on the request received in operation 402. For instance, the customer identifier may be determined and validated as part of logging a requestor into the customer account so that he or she may request the device configuration in the first place. In other embodiments of the invention, the requestor may indicate the customer identifier as part of the request. For instance, where the request is made via a web form, the requestor may indicate the customer identifier by entering that information into a particular field of the web form. Where the request is made via a REST or SOAP API call (as described elsewhere), a line of that call may indicate the customer identifier.

After operation 406, the operating procedures of FIG. 4 move to operation 408, which depicts determining a device identifier based on the request received in operation 402. Where the customer is requesting both the device configuration and a new network-backed mass storage device 100, this may comprise determining a unique device identifier for network storage service 202 and selecting that as the current device identifier. Where a network-backed mass storage device 100 is created with a fixed device identifier, operation 406 may comprise connecting the network-backed mass storage device 100 that is selected for the customer and reading its fixed device identifier. Where the customer already possesses network-backed mass storage device 100, the request in operation 402 may indicate this device identifier.

After operation 408, the operating procedures of FIG. 4 move to operation 410, which depicts generating a device configuration file for the network-backed mass storage device based on the request received in operation 402. This configuration file may comprise information that identifies the customer account and the network storage service 202, and which enables network-backed mass storage device 100 to communicate with network storage service 202 regarding data stored in the particular customer account. Generating the device configuration file may comprise generating a data file that identifies the network storage service 202 (such as a URL—uniform resource locator), the customer account, and the network-backed mass storage device 100 itself After operation 410, the operating procedures of FIG. 4 move to operation 412, which depicts determining whether the device configuration file generated in operation 410 may be directly transmitted to the network-backed mass storage device. In embodiments where network-backed mass storage device 100 is powered on and is already in communication with network storage service 202, it may be that the device configuration file may be directly transmitted to network-backed mass storage device 100 via wireless transmitter 110. This may occur, for instance, in the case where the device configuration file is being updated, network-backed mass storage device 100 already possesses a device configuration file that allows it to communicate with network storage service 202 and network-backed mass storage device 100 is connected to computing environment 220 via connector 102, which provides power to network-backed mass storage device 100.

If, in operation 412, it is determined that the device configuration file generated in operation 410 may be directly transmitted to the network-backed mass storage device, then the operating procedures of FIG. 4 move to operation 414. Operation 414 depicts transmitting the device configuration file generated in operation 410 to the network-backed mass storage device. This may comprise, for example, network storage service 202 transmitting the device configuration file to network-backed mass storage device 100 via wireless transmitter 110. After operation 414, the operating procedures of FIG. 4 move to operation 422, where the operating procedures of FIG. 4 end. In embodiments of the invention, after successfully transmitting the device configuration file generated in operation 410 to the network-backed mass storage device, the computer that implements the operating procedures of FIG. 4 may notify the requestor that the device configuration file generated in operation 410 was successfully transmitted to the network-backed mass storage device.

If, in operation 412, it is determined that the device configuration file generated in operation 410 may not be directly transmitted to the network-backed mass storage device, then the operating procedures of FIG. 4 move to operation 416. Operation 416 depicts transmitting he device configuration file generated in operation 410 to a computing environment of the customer that made the request depicted in operation 402. This may comprise, for example, making the device available via a web interface, so that a customer may download the device configuration file to computing environment 220, for later transfer to network-backed mass storage device 100.

After operation 416, the operating procedures of FIG. 4 move to operation 418. Operation 418 depicts determining whether the network-backed mass storage device is connected to the computing environment to which the device configuration file generated in operation 410 was transmitted in operation 416. If the network-backed mass storage device is not connected to the computing environment (such as by connector 102 being coupled to the computing environment's interface, where communications between network-backed mass storage device 100 and computing environment 220 have been established via this connection), then the operating procedures of FIG. 4 loop on operation 418 until such a time when the network-backed mass storage device is connected to the computing environment. If the network-backed mass storage device is connected to the computing environment, then the operating procedures of FIG. 4 move to operation 420.

Operation 420 depicts transmitting the device configuration file generated in operation 410 from the computing environment to which the device configuration file generated in operation 410 was transmitted in operation 416 to the network-backed mass storage device. This may comprise, for example executing a process on computing environment 220 that periodically checks to determine whether network-backed mass storage device 100 is connected to computing environment 220, and if so, transferring the device configuration file from computing environment 220 to network-backed mass storage device 100. In other embodiments of the invention, this may comprise receiving user input indicative of an instruction to transmit the device configuration file from computing environment 220 to network-backed mass storage device 100, and carrying out that instruction by computing environment 220.

After operation 420, the operating procedures of FIG. 4 move to operation 422, where the operating procedures of FIG. 4 end. In embodiments of the invention, after successfully transmitting the device configuration file generated in operation 410 from the computing environment to the network-backed mass storage device, the computer that implements the operating procedures of FIG. 4 may notify the requestor that the device configuration file generated in operation 410 was successfully transmitted to the network-backed mass storage device.

FIG. 5 depicts example operating procedures for making files stored on a network storage service accessible to a computing environment via a network-backed mass storage device that is coupled to the computing environment. These operating procedures of FIG. 5 may be used, for instance, to use network-backed mass storage device 100 of FIG. 1 to make files stored on network storage service 202 of FIG. 2 available to computing environment 220 of FIG. 2. Additionally, the operating procedures of FIG. 5 may be implemented by network-backed mass storage device 100 of FIG. 1.

Operation 502 determines whether the network-backed mass storage device is connected to the computing environment. This may comprise, for example, determining whether network-backed mass storage device 100 is connected to computing environment 220 via connector 20 being inserted into an interface of the computing environment by polling the computing environment's interface to determine if anything is connected to the computing environment's interface, and, if so, what is connected to the computing environment's interface. If the network-backed mass storage device is not connected to the computing environment, then the operating procedures of FIG. 5 loop on operation 502 until such a time as the network-backed mass storage device is connected to the computing environment. If the network-backed mass storage device is connected to the computing environment, the operating procedures of FIG. 5 move to operation 504.

Operation 504 depicts establishing a connection between the network-backed mass storage device and the network storage service. In embodiments, the network-backed mass storage device 100 may initiate this connection with network storage service 202 by sending a request to initiate a connection via wireless transmitter 110. This request may include, for example, information that authenticates the network-backed mass storage device 100 to network storage service 202, such as a user account and password, or a unique identifier for the network-backed mass storage device 100 itself. This initial request to initiate a connection may be the start of a handshaking process in which multiple messages are sent between network-backed mass storage device 100 and network storage service 202 to establish the connection. In embodiments, network-backed mass storage device 100 may be configured with an IP address for network storage service 202 so that network-backed mass storage device 100 is aware of where to send the initial request.

After operation 504, the operating procedures of FIG. 5 move to operation 506, which depicts the network-backed mass storage device receiving a set of files stored on the web services platform. The network storage service 202 may determine a set of files associated with the network-backed mass storage device 100 (such as via a customer account associated with network-backed mass storage device 100), and send those files to the network-backed mass storage device 100. In embodiments, it may be that network-backed mass storage device 100 is associated with a user account, but that particular network-backed mass storage device 100 is not authorized to access all of the files (or, for instance, may have read access, but not write access to certain files). In such embodiments, the network storage service 202 may send the network-backed mass storage device 100 only those files to which that particular device has access, and/or send those files along with an indication of the device's access permissions for each file.

After operation 506, the operating procedures of FIG. 5 move to operation 508, which determines determining whether the files received in operation 506 are stored on the network storage service in a block format. If the files received in operation 506 are stored on the network storage service in a block format, the operating procedures of FIG. 5 move to operation 512. If the files received in operation 506 are not stored on the network storage service in a block format, the operating procedures of FIG. 5 move to operation 510. For example, the files may be stored on the network storage service 202 in a bucket format as is described elsewhere. In embodiments where the files are stored on the network storage service 202 in a bucket format, the network storage service 202 may send the network-backed mass storage device 100 an indication of this. In other embodiments, network-backed mass storage device 100 may be configured to be aware that files are stored on network storage service 202 in buckets, such as having that information stored in the device configuration file of FIG. 5.

Operation 510 depicts translating the files received in operation 506 from a format in which they are stored on the network storage service to a block format. In embodiments of the invention, this may comprise retrieving the file structure of the files from the network-backed mass storage device 100 and translating that file structure to a block format. In other embodiments, this may comprise retrieving metadata of the files and using that metadata to translate the file structure into a block format. In other embodiments, this may comprise retrieving the files themselves and translating them into a block format.

In embodiments, operation 510 may be implemented by network-backed mass storage device 100. In other embodiments, network-backed mass storage device 100 and cloud storage service 202 may communicate through an intermediary—or proxy—computing device, across a communications network, and this proxy may implement operation 510. In embodiments, this proxy may be a part of cloud storage service 202, and still serves as an intermediary between network-backed mass storage device 100 and the part of cloud storage service 202 where data is stored in a non-block format. Where network-backed mass storage device 100 sends data in a block format, and this data is translated into the network storage service's format, it may conserve bandwidth to do so. For example, where a small portion of a large file has changed, it may be possible to send only those changed blocks and not the new version of the entire large file. In contrast, where network-backed mass storage device 100 translates data from the block format before sending it, network-backed mass storage device 100 may then send the new version of the entire large file to convey those changes to cloud storage service 202.

After operation 510, the operating procedures of FIG. 5 move to operation 512. The operating procedures of FIG. 5 may also move to operation 512 where, at operation 508, it is determined that the files are stored on the network storage service in a block format. Operation 52 depicts presenting the files from the network storage service as part of a file system of the computing environment to which the network-backed mass storage device is connected. For example, this may comprise presenting the files in one or more folders nested within a parent folder that is the network-backed mass storage device 100 itself.

After operation 512, the operating procedures of FIG. 5 move to operation 514, where these operating procedures end.

FIG. 6 depicts example operating procedures for writing files from a computing environment to a network storage service via a network-backed mass storage device that is coupled to the computing environment. These operating procedures of FIG. 6 may be used, for instance, to use network-backed mass storage device 100 of FIG. 1 to write files from computing environment 220 of FIG. 2. Additionally, the operating procedures of FIG. 6 may be implemented by network-backed mass storage device 100 of FIG. 1.

Operation 602 depicts receiving a command from the computing environment to write a file to the network-backed mass storage device. This may comprise, for example, receiving user input indicative of copying a file from computing environment 220 to network-backed mass storage device 100.

After operation 602, the operating procedures of FIG. 6 move to operation 604. Operation 604 depicts determining whether the computing environment that issued the command in operation 602 is authorized to use the network-backed mass storage device that received the command in operation 602 to write data to the customer's network storage service account as indicated in operation 602. This may comprise, for example where the file to be written involves overwriting another file, determining whether the network-backed mass storage device 100 itself, or a user account associated with network-backed mass storage device 100, has permission to write to files on network storage service 202. In other embodiments, this may comprise, for example where the file to be written is a new file, determining whether the network-backed mass storage device 100 itself, or a user account associated with network-backed mass storage device 100, has permission to create new files on network storage service 202.

If, in operation 604, it is determined that the computing environment that issued the command in operation 602 is not authorized to use the network-backed mass storage device that received the command in operation 602 to write data to the customer's network storage service account as indicated in operation 602, then the operating procedures of FIG. 6 move to operation 616, where the operating procedures of FIG. 6 end. In embodiments of the invention, upon determining that that the computing environment that issued the command in operation 602 is not authorized to use the network-backed mass storage device that received the command in operation 602 to write data to the customer's network storage service account as indicated in operation 602, the computer that implements the operating procedures of FIG. 6 may notify the requestor that the command is invalid before moving to operation 616.

If, instead, in operation 604, it is determined that the computing environment that issued the command in operation 602 is authorized to use the network-backed mass storage device that received the command in operation 602 to write data to the customer's network storage service account as indicated in operation 602, then the operating procedures of FIG. 6 move to operation 606. Operation 606 depicts determining whether the network-backed mass storage device that received the command in operation 602 is in communication with the web services platform. If it is not, the operations of transferring the data to the network storage service may be performed at a later time—asynchronously—as opposed to at the time that the computing environment issues the command to write the data, which is synchronously. In embodiments, the network-backed mass storage device 100 may not be in communication with the network storage service 202 because they communicate via a cellular data network, and that network is currently inoperative. In embodiments, determining whether the network-backed mass storage device that received the command in operation 602 is in communication with the web services platform may comprise the network-backed mass storage device pinging or otherwise sending a message to network storage service that network storage service will acknowledge by sending a message to network-backed mass storage device 100.

If, in operation 606, it is determined that the network-backed mass storage device that received the command in operation 602 is not in communication with the web services platform, then the operating procedures of FIG. 6 move to operation 608. Operation 608 depicts storing the file indicated by the command in operation 602 to the network-backed mass storage device. Where the network-backed mass storage device is not in communication with the network storage service at the time that the computing environment requests writing a file, this does not mean that no write may occur. Where network-backed mass storage device contains a memory 106, the file may be locally stored on network-backed mass storage device so that it may be later uploaded from network-backed mass storage device to the network storage service. After operation 608, the operating procedures of FIG. 6 return to operation 606, where it is determined whether the network-backed mass storage device that received the command in operation 602 is in communication with the web services platform.

In embodiments of the invention, data access both from the network storage service and the computing environment may be locally cached on the network-backed mass storage device. Where the network-backed mass storage device lacks enough storage space to store all of the accessed data, a portion of this accessed data may be cached. For example, the portion to be cached may be determined via an algorithm, such as storing the most-recently accessed data, or it may be determined via user input to the computing environment that indicates which data to cache.

If, instead, in operation 606, it is determined that the network-backed mass storage device that received the command in operation 602 is in communication with the web services platform, then the operating procedures of FIG. 6 move to operation 610. Operation 610 depicts determining whether the network storage service stores files in a block format. In embodiments of the invention, network-backed mass storage device 100 stores files in a block format, so where network storage service 202 does not, a translation to the network storage service's file format may be performed. Operation 610 may comprise the network-backed mass storage device determining the format used by the network storage service where the network-backed mass storage device is configured with this information, such as with the device configuration file of FIG. 6. In other embodiments, the network-backed mass storage device may query the network storage service for its storage format, and the network storage service may respond with this information.

If, in operation 610, it is determined that the network storage service does not store files in a block format, the operating procedures of FIG. 6 move to operation 612. In such embodiments, it may be that the file to be written is to be translated by network-backed mass storage device from a block format to a format used by the network storage service.

If, instead, in operation 610, it is determined that the network storage service stores files in a block format, the operating procedures of FIG. 6 move to operation 614. In such embodiments, it may be that the network-backed mass storage device does not need to translate the file to be written from a block format to another format because the network storage service itself stores files in a block format.

Operation 612 depicts translating the file indicated by the command in operation 602 from a block format to a format used by the network storage service. This may be performed similar to operation 510 of FIG. 5, which depicts the opposite translation—translating files from a format of the network storage service to a block format. Similar to as described with respect to operation 510, operation 612 may be implemented on network-backed mass storage device 100, or on a proxy computing device that is either between network-backed mass storage device 100 and network storage service 202, or is part of network storage service 202.

After operation 612, the operating procedures of FIG. 6 move to operation 614. The operating procedures of FIG. 6 may also move to operation 614 where, at operation 610, it is determined that the network storage service stores files in a block format. Operation 614 depicts sending the files (possibly translated in operation 612) from the network-backed mass storage device to the network storage service. Where a REST API is used, as is described elsewhere, this may comprise sending one or more PUT commands from the network-backed mass storage device to the network storage service. In embodiments a customer account may have multiple network-backed mass storage devices. In such embodiments, each network-backed mass storage device may be issued the same private key, or its own private key. Where each network-backed mass storage device is issued its own private key, then even though each network-backed mass storage device may be uploading data to one account on the network storage service, then an inventory may still be made on a per-device basis based on the identification of the private key used to encrypt the data.

After operation 614, the operating procedures of FIG. 6 move to operation 616, where the operating procedures of FIG. 6 end. In embodiments of the invention, after, in operation 614, uploading the file to the network storage service as indicated by the command of operation 602, the computer that implements the operating procedures of FIG.

6 may notify the requestor that the file was successfully uploaded to the network storage service before moving to operation 616.

Figure 7:
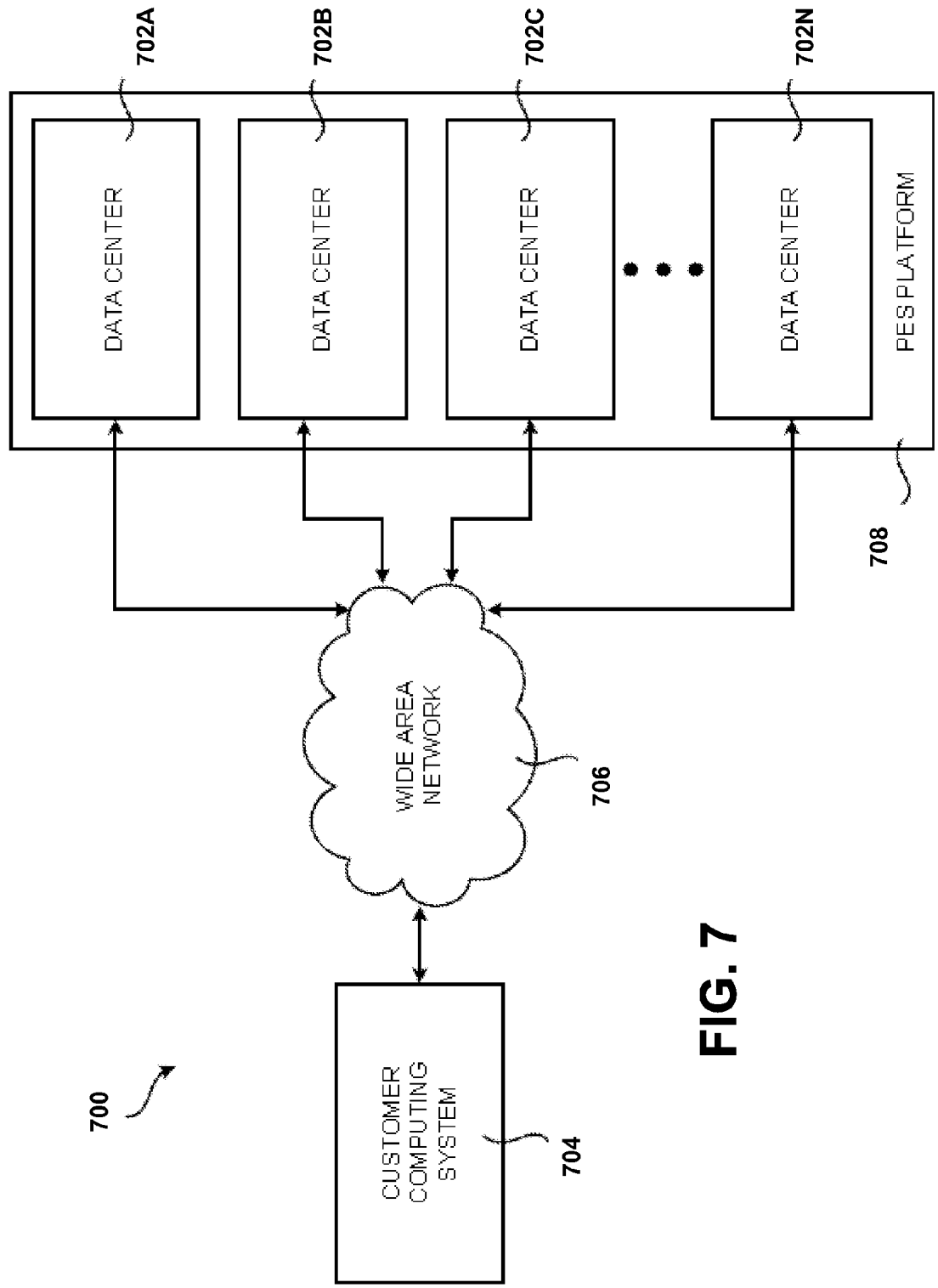
FIG. 7 depicts an example computing system for launching virtual machine instances, such as in a network storage service.

FIG. 7 depicts an example programmable execution service ("PES") platform 708 (which may be referred to as a "PES 708"). PES 708 may be used to implement the network storage service as described herein, such as network storage service 202 as depicted in FIGS. 2 and 3. FIG. 7 depicts a system and network diagram that shows an illustrative operating environment 700 that includes PES 708 for providing on-demand access to computing resources, such as virtual machine instances. As will be described in greater detail below, the computing resources may be launched or otherwise instantiated based upon an expected cost and value of the computing resources to an operator of the PES platform 708.

The PES platform 708 can provide computing resources for executing applications on a permanent or an as-needed basis. The computing resources provided by the PES platform 708 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as Web servers and/or one large processing resource as a database server, for example.

The computing resources provided by the PES platform 708 are enabled by one or more data centers 702A-702N (which may be referred herein singularly as "a data center 702" or in the plural as "the data centers 702"). The data centers 702 are facilities utilized to house and operate computer systems and associated components. The data centers 702 typically include redundant and backup power, communications, cooling, and security systems. The data centers 702 might also be located in geographically disparate locations. One illustrative configuration for a data center 702 that implements the concepts and technologies disclosed herein for launching virtual machine instances will be described below with regard to FIG. 8.

The customers and other consumers of the PES platform 708 may access the computing resources provided by the data centers 702 over a wide-area network ("WAN") 706. Although a WAN is illustrated in FIG. 7, it should be appreciated that a local-area network ("LAN"), the Internet, or any other networking topology known in the art that connects the data centers 702 to remote customers and other users may be utilized. It should also be appreciated that combinations of such networks might also be utilized.

The customer computing system 704 is a computer utilized by a customer or other consumer of the PES platform 708. For instance, the customer computing system 704 may be a server computer, a desktop or laptop personal computer, a tablet computer, a wireless telephone, a PDA, an e-reader, a game console, a set-top box, or any other computing device capable of accessing the PES platform 708.

As will be described in greater detail below, the customer computing system 704 may be utilized to configure aspects of the computing resources provided by the PES platform 708. In this regard, the PES platform 708 might provide a Web interface through which aspects of its operation may be configured through the use of a Web browser application program executing on the customer computing system 704. Alternatively, a stand-alone application program executing on the customer computing system 704 might access an application programming interface ("API") exposed by the PES platform 708 for performing the configuration operations. Other mechanisms for configuring the operation of the PES platform 708, including launching new virtual machine instances on the PES platform 708, might also be utilized.

According to embodiments disclosed herein, the capacity of purchased computing resources provided by the PES platform 708 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of the PES platform 708 can be scaled on-demand.

Auto scaling is one mechanism for scaling computing resources in response to increases or lulls in demand for the resources. Auto scaling allows customers of the PES platform 708 to configure the platform 708 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in the PES platform 708.

The PES platform 708 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 8:
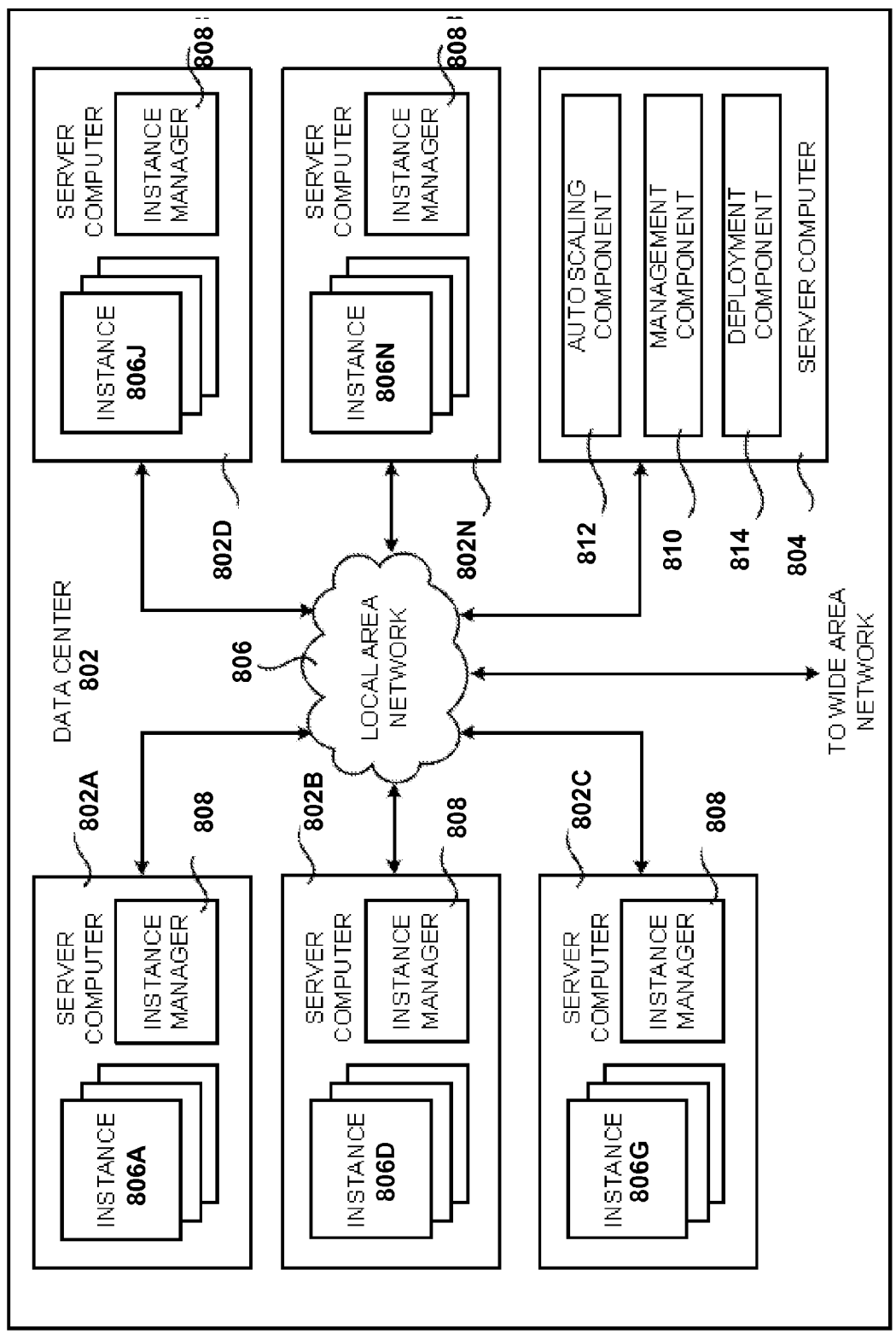
FIG. 8 depicts a computing system diagram that illustrates a configuration for a data center for launching virtual machine instances.

FIG. 8 depicts a computing system diagram that illustrates one configuration for a data center 802 that implements a PES platform 708, including the concepts and technologies disclosed herein for launching a virtual machine instance. The example data center 802 shown in FIG. 8 includes several server computers 802A-802N (which may be referred herein singularly as "a server computer 802" or in the plural as "the server computers 802") for providing computing resources for executing an application. The server computers 802 may be standard tower or rack-mount server computers configured appropriately for providing the computing resources described above. For instance, in one implementation the server computers 802 are configured to provide instances 806A-806N of computing resources.

In one embodiment, the instances 806A-806N (which may be referred herein singularly as "an instance 806" or in the plural as "the instances 806") are virtual machine instances. As known in the art, a virtual machine instance is an instance of a software implementation of a machine (i.e. a computer) that executes programs like a physical machine. In the example of virtual machine instances, each of the servers 802 may be configured to execute an instance manager 808 capable of executing the instances. The instance manager 808 might be a hypervisor or another type of program configured to enable the execution of multiple instances 806 on a single server 802, for example. As discussed above, each of the instances 806 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein might be utilized with instances of storage resources, instances of data communications resources, and with other types of resources. The embodiments disclosed herein might also execute all or a portion of an application directly on a computer system without utilizing virtual machine instances.

The data center 802 shown in FIG. 8 also includes a server computer 804 reserved for executing software components for managing the operation of the data center 802, the server computers 802, and the instances 806. In particular, the server computer 804 might execute a management component 810. As discussed above, a customer of the PES platform 808 might utilize the customer computing system 804 to access the management component 810 to configure various aspects of the operation of PES platform 808 and the instances 806 purchased by the customer. For example, the customer may purchase instances and make changes to the configuration of the instances. The customer might also specify settings regarding how the purchased instances are to be scaled in response to demand. The customer might also provide requests to launch instances to the management component 810.

As also described briefly above, an auto scaling component 812 scales the instances 806 based upon rules defined by a customer of the PES platform 808. In one embodiment, for instance, the auto scaling component 812 allows a customer to specify scale up rules for use in determining when new instances should be instantiated and scale down rules for use in determining when existing instances should be terminated.

The auto scaling component 812 may execute on a single server computer 804 or in parallel across multiple server computers 802 in the PES platform 808. In addition, the auto scaling component 812 may consist of a number of sub-components executing on different server computers 802 or other computing devices in the PES platform 808. The auto scaling component 812 may be implemented as software, hardware, or any combination of the two. The auto scaling component 812 may monitor available computing resources in the PES platform 808 over an internal management network, for example.

As discussed briefly above, the data center 802 may also be configured with a deployment component 814 to assist customers in the deployment of new instances 806 of computing resources. The deployment component 814 may receive a configuration from a customer that includes data describing how new instances 806 should be configured. For example, the configuration might specify one or more applications that should be installed in new instances 806, provide scripts and/or other types of code to be executed for configuring new instances 806, provide cache warming logic specifying how an application cache should be prepared, and other types of information.

The deployment component 814 utilizes the customer-provided configuration and cache warming logic to configure, prime, and launch new instances 806. The configuration, cache warming logic, and other information may be specified by a customer using the management component 810 or by providing this information directly to the deployment component 814. Other mechanisms might also be utilized to configure the operation of the deployment component 810.

In the example data center 802 shown in FIG. 8, an appropriate LAN 806 is utilized to interconnect the server computers 802A-802N and the server computer 804. The LAN 806 is also connected to the WAN 706 illustrated in FIG. 7. It should be appreciated that the network topology illustrated in FIGS. 7 and 8 has been greatly simplified and that many more networks and networking devices may be utilized to interconnect the various computing systems disclosed herein. Appropriate load balancing devices or software modules might also be utilized for balancing a load between each of the data centers 802A-802N, between each of the server computers 802A-802N in each data center 802, and between instances 806 purchased by each customer of the PES platform 808. These network topologies and devices should be apparent to those skilled in the art.

It should be appreciated that the data center 802 described in FIG. 8 is merely illustrative and that other implementations might be utilized. In particular, functionality described herein as being performed by the management component 810, the auto scaling component 812, and the deployment component 814 might be performed by one another, might be performed by other components, or might be performed by a combination of these or other components. Additionally, it should be appreciated that this functionality might be implemented in software, hardware, or a combination of software and hardware. Other implementations should be apparent to those skilled in the art.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems and other devices capable of communicating via a network. These devices may be considered to be computing nodes, along with each virtual machine of one or more virtual machines that executes on such devices.

Most embodiments utilize at least one network that would be familiar to those skilled in the art for supporting communications using any of a variety of protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java, C, C# or C++ or any scripting language, such as Perl, Python or TCL as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices or any other medium that can be used to store the desired information and that can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected" is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

While the present disclosure has been made in connection with preferred embodiments, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Aspects of the disclosure may be implemented with computer-readable storage media, which do not include signals and/or computer-readable communication media. Thus, the invention, or certain aspects or portions thereof, may take the form of program code (i.e., instructions) embodied in tangible, or non-transitory, media, such as floppy diskettes, CD-ROMs, hard drives or any other machine-readable storage medium. Likewise, certain aspects or portions of the disclosure may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only, and not considered as encompassing all aspects of the disclosure.

What is claimed is:

1. A method, comprising:
    determining, by a device, that the device is coupled to a computing device via a physical connector;
    establishing, by the device, a communication channel with a network-accessible storage service;
    receiving, by the device, an identification of a first file from the network-accessible storage service via the communication channel; and
    transmitting, by the device, the identification of the first file to the computing device via the physical connector, wherein the identification of the first file is translated from a format used by the network-accessible storage service to a block-based format used by a computing environment of the computing device, and wherein the translated identification, as transmitted by the device, presents the first file as part of the computing environment when interpreted by an existing file system driver of the computing environment.

2. The method of claim 1, further comprising:
    receiving, by the device, an indication from the computing device of data from the computing device to write to the device;
    translating the data from the block-based format to the format used by the network-accessible storage service; and
    sending the translated data in the format used by the network-accessible storage service to the network-accessible storage service via the communication channel.

3. The method of claim 2, further comprising:
    encrypting the translated data after translating the data and before sending the translated data to the network-accessible storage service.

4. The method of claim 2, further comprising writing, by the device, the data to a memory of the device after receiving the indication of the data.

5. The method of claim 4, wherein writing the data to the first memory of the device comprises:
    encrypting, by the device, the data; and
    writing the data to the first memory of the device.

6. The method of claim 5, further comprising:
    receiving, by the device, an encryption key from the network-accessible storage service; and
    wherein encrypting, by the device, the data comprises encrypting the data with the encryption key.

7. The method of claim 6, further comprising communicating, by the device, with the computing device according to a storage device protocol.

8. A non-transitory computing device-readable medium, bearing computing device-executable instructions that, when executed on a computing device, cause the computing device to perform operations comprising:
    determining that a device is coupled to a second computing device via a physical connector;
    establishing a communication channel with a network-accessible storage service; receiving an identification of a first file from the network-accessible storage service via the communication channel; and
    transmitting the identification of the first file to the second computing device via the physical connector, wherein the identification of the first file is translated from a format used by the network-accessible storage service to a block-based format used by a computing environment of the second computing device, and wherein the translated identification, as transmitted by the computing device, presents the first file as part of the computing environment when interpreted by an existing file system driver of the computing environment.

9. The non-transitory computing device-readable medium of claim 8, further bearing computing device-executable instructions that, when executed on a computing device, cause the computing device to perform operations comprising:
    receiving an indication from the second computing device of data from the computing device to write to the device;
    translating the data from the block-based format to the format used by the network-accessible storage service; and
    sending the translated data in the format used by the network-accessible storage service to the network-accessible storage service via the communication channel.

10. The non-transitory computing device-readable medium of claim 9, wherein sending the translated data in the format used by the network-accessible storage service to the network-accessible storage service via the communication channel comprises:
    sending the network-accessible storage service a PUT request identified in a Hypertext Transfer Protocol (HTTP) file in a Representational State Transfer (REST) application programming interface (API) call.

11. The non-transitory computing device-readable medium of claim 8, wherein establishing, by the device, the communication channel with the network-accessible storage service comprises:
  sending, by the device, an identifier to the network-accessible storage service that uniquely identifies the device among all devices authorized by the network-accessible storage service.

12. The non-transitory computing device-readable medium of claim 8, wherein establishing, by the device, the communication channel with the network-accessible storage service comprises:
  sending, by the device, an identifier to the network-accessible storage service that uniquely identifies a user account associated with the device among all user accounts authorized by the network-accessible storage service.

13. The non-transitory computing device-readable medium of claim 8, wherein receiving the identification of the first file from the network-accessible storage service via the communication channel comprises:
  sending the network-accessible storage service a request for a listing of files associated with a user account identified in the request.

14. The non-transitory computing device-readable medium of claim 8, further bearing computing device-executable instructions that, when executed on a computing device, cause the computing device to perform operations comprising:
  receiving an indication of data to be written from the second computing device; sending a version of the data translated into the format used by the network-accessible storage service to the network accessible storage service via the communication channel; and caching at least a portion of the data in the block-based format in a second memory.

15. The non-transitory computing device-readable medium of claim 14, wherein caching at least a portion of the data in the block-based format in a second memory comprises:
  determining to cache at least the portion of the data based on an algorithm.

16. The non-transitory computing device-readable medium of claim 14, wherein caching at least a portion of the data in the block-based format in a second memory comprises:
  determining to cache at least the portion of the data based on user input to the second computing device indicative of caching at least the portion of the data.

17. The non-transitory computing device-readable medium of claim 8, bearing computing device-executable instructions that, when executed on a computing device, cause the computing device to perform operations comprising:
  downloading the computing-device executable instructions to a network-backed mass storage device.

18. A system for providing seamless network-accessible storage to a computing environment of a computing device as a storage device, comprising:
  at least one processor;
  a wireless transmitter;
  a physical connector that is configured to couple to the computing device using a device port of the computing device;
  at least one memory that is configured to store data that is received from the computing device via the physical connector, and to store data that is received from a network-accessible storage service via a wireless transmitter; and
  the at least one memory bearing instructions that, upon execution by the at least one processor, cause the system to at least:
    send an indication of metadata about at least part of the data stored in the at least one memory to the network-accessible storage service via the wireless transmitter, sending the indication of metadata being performed independently of sending at least part of the data to the network-accessible storage service, wherein the indication of metadata, as sent by the system, presents at least part of the data that is received from the network-accessible storage service as part of the computing environment when interpreted by an existing file system driver of the computing environment.

19. The system of claim 18, wherein the instructions that, upon execution by the at least one processor, cause the system to at least send the indication of metadata further cause the system to at least:
  send the indication of metadata, the metadata identifying that at least part of the data has been accessed.

20. The system of claim 18, wherein the instructions that, upon execution by the at least one processor, cause the system to at least send the indication of metadata further cause the system to at least:
  send the indication of metadata, the metadata identifying a file stored in the at least one memory.

21. The system of claim 18, wherein the instructions that, upon execution by the at least one processor, cause the system to at least send the indication of metadata further cause the system to at least:
  send the indication of metadata in response to receiving a request from the network-accessible storage service for an audit of data stored in the first memory.

22. The system of claim 18, wherein the instructions that, upon execution by the at least one processor, cause the system to at least send the indication of metadata further cause the system to at least:
  send the indication of metadata in response determining that a pre-determined period of time has elapsed since last sending an audit of data stored in the first memory to the network-accessible storage service.

23. The system of claim 18, wherein the instructions that, upon execution by the at least one processor, cause the system to at least send the indication of metadata further cause the system to at least:
  send an indication of the computing device to the network-accessible storage service.

24. The system of claim 18, wherein the instructions that, upon execution by the at least one processor, cause the system to at least send the indication of metadata further cause the system to at least:
  send an indication of a user account associated with the system to the network-accessible storage service.

25. The system of claim 18, wherein the instructions that, upon execution by the at least one processor, cause the system to at least send the indication of metadata further cause the system to at least:
  send a unique identifier of the system to the network-accessible storage service.

* * * * *